(12) United States Patent  (10) Patent No.: US 12,405,467 B2
Wang et al.  (45) Date of Patent: Sep. 2, 2025

(54) OPTICAL DISPLAYING SYSTEM, DISPLAYING DEVICE AND METHOD FOR CONTROLLING OPTICAL DISPLAYING SYSTEM

(71) Applicants: Beijing BOE Optoelectronics Technology Co., Ltd., Beijing (CN); BOE Technology Group Co., Ltd., Beijing (CN)

(72) Inventors: Chenru Wang, Beijing (CN); Ruijun Dong, Beijing (CN); Yali Liu, Beijing (CN); Ke Li, Beijing (CN); Yulong Wu, Beijing (CN); Feng Qu, Beijing (CN); Hao Zhang, Beijing (CN); Lili Chen, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 754 days.

(21) Appl. No.: 17/627,079

(22) PCT Filed: Mar. 9, 2021

(86) PCT No.: PCT/CN2021/079762
§ 371 (c)(1),
(2) Date: Jan. 13, 2022

(87) PCT Pub. No.: WO2021/218402
PCT Pub. Date: Nov. 4, 2021

(65) Prior Publication Data
US 2022/0397767 A1    Dec. 15, 2022

(30) Foreign Application Priority Data
Apr. 26, 2020 (CN) .......................... 202010340265.1

(51) Int. Cl.
*G02B 27/01* (2006.01)
*G02B 27/28* (2006.01)

(52) U.S. Cl.
CPC ..... *G02B 27/0172* (2013.01); *G02B 27/0101* (2013.01); *G02B 27/017* (2013.01); *G02B 27/0176* (2013.01); *G02B 27/283* (2013.01)

(58) Field of Classification Search
CPC .............. G02B 27/017; G02B 27/0172; G02B 27/0176; G02B 2027/0174;
(Continued)

(56) References Cited
U.S. PATENT DOCUMENTS 5,408,346 A * 4/1995 Trissel ................. G02B 5/3016
349/115
5,831,712 A * 11/1998 Tabata ............... G02B 27/0172
351/158
(Continued)

FOREIGN PATENT DOCUMENTS

CN 205899144 U 1/2017
CN 108469716 A 8/2018
(Continued)

OTHER PUBLICATIONS

CN202010340265.1 first office action.

*Primary Examiner* — Bao-Luan Q Le
(74) *Attorney, Agent, or Firm* — IPro, PLLC (57) ABSTRACT

An optical displaying system includes a display screen; a first light splitting unit, wherein a light ray emitted by the display screen is converted into a first-type polarized light or a second-type polarized light after passing through the first light splitting unit; an imaging unit, wherein a light ray exiting from the first light splitting unit forms an enlarged image corresponding to a first focal length after passing through the imaging unit; a second light splitting unit; a first optical-path unit, wherein the first-type polarized light trans- (Continued)

mitted from the second light splitting unit forms an enlarged image corresponding to a second focal length, and is converted into the second-type polarized light, after passing through the first optical-path unit; and a second optical-path unit, wherein the second-type polarized light reflected from the second light splitting unit is converted into the first-type polarized light after passing through the second optical-path unit.

13 Claims, 3 Drawing Sheets

(58) Field of Classification Search
CPC .......... G02B 2027/0178; G02B 27/283; G02B 27/0101; G02B 30/26; G02B 2027/0134
See application file for complete search history.

(56) References Cited

U.S. PATENT DOCUMENTS

| | | | | |
|---|---|---|---|---|
| 6,147,805 | A * | 11/2000 | Fergason | G02B 27/0172 359/633 |
| 10,908,424 | B2 * | 2/2021 | Lee | G02B 27/286 |
| 11,415,811 | B2 * | 8/2022 | Zheng | G02B 5/3083 |
| 11,467,535 | B2 * | 10/2022 | Seo | G03H 1/28 |
| 11,624,915 | B2 * | 4/2023 | Hong | G02B 27/0172 359/630 |
| 2002/0101664 | A1 * | 8/2002 | King | G02B 27/0172 359/629 |
| 2005/0180021 | A1 * | 8/2005 | Travers | G02B 27/0172 359/630 |
| 2016/0077351 | A1 * | 3/2016 | Iwane | G02B 17/002 359/489.08 |
| 2018/0284454 | A1 * | 10/2018 | Reed | G02B 27/0172 |
| 2019/0064524 | A1 * | 2/2019 | Cobb | G02B 1/11 |
| 2019/0324271 | A1 * | 10/2019 | Lee | G02B 27/286 |
| 2020/0151956 | A1 * | 5/2020 | Goslin | G02B 27/0172 |
| 2020/0209641 | A1 * | 7/2020 | Zheng | G02B 27/0172 |
| 2021/0208400 | A1 * | 7/2021 | Hong | G02B 27/283 |
| 2023/0359061 | A1 * | 11/2023 | Won | G02B 30/26 |

FOREIGN PATENT DOCUMENTS

| | | | | |
|---|---|---|---|---|
| CN | 109387942 A | | 2/2019 | |
| CN | 109613705 A | * | 4/2019 | ......... G02B 27/0093 |
| CN | 208902979 U | | 5/2019 | |
| CN | 110967831 A | | 4/2020 | |
| CN | 111045213 A | | 4/2020 | |
| CN | 111487786 A | | 8/2020 | |
| JP | 2010122589 A | | 6/2010 | |

* cited by examiner

OPTICAL DISPLAYING SYSTEM, DISPLAYING DEVICE AND METHOD FOR CONTROLLING OPTICAL DISPLAYING SYSTEM

CROSS REFERENCE TO RELEVANT APPLICATIONS

The application claims the priority of the Chinese patent application filed on Apr. 26, 2020 before the Chinese Patent Office with the application number of 202010340265.1 and the title of "OPTICAL DISPLAY SYSTEM, CONTROL METHOD AND DISPLAY DEVICE", which is incorporated herein in its entirety by reference.

TECHNICAL FIELD

The present disclosure relates to the technical field of displaying, and particularly relates to an optical displaying system, a controlling method thereof, and a displaying device.

BACKGROUND

When human eyes are observing the real world, the stereoscopic vision is generated by binocular parallax. Based on such a principle, researchers have developed Virtual Reality (VR) products and Augmented Reality (AR) products, to realize 3D displaying.

When a user is watching a VR product or an AR product, the two eyes can individually see the images of the same scene at different visual angles, thereby generating a parallax, and then the brain integrates the images, thereby realizing stereo displaying.

During the watching process, the two eyes individually regulate the diopters by using the crystalline lenses, to enable the images of the object to focus on the virtual-image planes of the retinas. When the brain is integrating the images, because the perspective object and the virtual-image plane have a depth difference therebetween, the eyes are required to perform convergence rotation to adapt for such a depth difference.

SUMMARY

The embodiments of the present disclosure provide an optical displaying system, a controlling method thereof, and a displaying device.

The embodiments of the present disclosure employ the following technical solutions:

In an aspect, there is provided an optical displaying system, wherein the optical displaying system comprises: a display screen;

a first light splitting unit, disposed at a displaying side of the display screen, wherein after a light ray emitted by the display screen passes through the first light splitting unit, the light ray is converted into a first-type polarized light or a second-type polarized light;

an imaging unit, disposed at a light exiting side of the first light splitting unit, wherein after a light ray exiting from the first light splitting unit passes through the imaging unit, the light ray forms an enlarged image corresponding to a first focal length;

a second light splitting unit, disposed at a light exiting side of the imaging unit, and configured to transmit the first-type polarized light and reflect the second-type polarized light;

a first optical-path unit, wherein after the first-type polarized light transmitted out of the second light splitting unit passes through the first optical-path unit, the first-type polarized light forms an enlarged image corresponding to a second focal length, is converted into the second-type polarized light, and then is reflected to an observation position by the second light splitting unit; and a second optical-path unit, wherein after the second-type polarized light reflected out of the second light splitting unit passes through the second optical-path unit, the second-type polarized light is converted into the first-type polarized light, and then is transmitted to the observation position by the second light splitting unit.

Optionally, the first optical-path unit comprises a first reflecting mirror, and a first quarter-wave plate disposed in an optical path from the second light splitting unit to the first reflecting mirror.

Optionally, the first quarter-wave plate is a birefringent single-crystal wave plate.

Optionally, the second optical-path unit is further configured to transmit an external light ray, wherein the external light ray passes through sequentially the second optical-path unit and the second light splitting unit and is transmitted to the observation position.

Optionally, the second optical-path unit comprises a semi-transmission and semi-reflection mirror, and a second quarter-wave plate disposed in an optical path from the second light splitting unit to the semi-transmission and semi-reflection mirror.

Optionally, the semi-transmission and semi-reflection mirror is formed by plating a semi-transmission and semi-reflection film on a plate glass, or is formed by plating a semi-transmission and semi-reflection film on a spherical mirror;

wherein the spherical mirror has a constant thickness, and the thickness of the spherical mirror is less than 3 mm.

Optionally, the second optical-path unit is further configured so that, after the second-type polarized light reflected out of the second light splitting unit passes through the second optical-path unit, the second-type polarized light forms an enlarged image corresponding to a third focal length, wherein the second focal length and the third focal length are different.

Optionally, the second optical-path unit comprises a second reflecting mirror, and a third quarter-wave plate disposed in an optical path from the second light splitting unit to the second reflecting mirror, wherein a curvature of the first reflecting mirror and a curvature of the second reflecting mirror are different.

Optionally, the second light splitting unit comprises a polarization beam splitting prism.

Optionally, the imaging unit comprises at least one lens.

Optionally, the first light splitting unit comprises a liquid-crystal phase modulator, wherein the liquid-crystal phase modulator converts the light ray emitted by the display screen into the first-type polarized light or the second-type polarized light by electric control.

Optionally, the first light splitting unit comprises a polarizer; and the polarizer is disposed at the displaying side of the display screen, the polarizer comprises a first-type polarizer and a second-type polarizer, and the polarizer converts a light ray emitted by the display screen into the first-type polarized light or the second-type polarized light manually or mechanically; or, the polarizer clings to a display surface of the display screen, the polarizer comprises a plurality of first-type polarizers and a plurality of second-type polarizers that are arranged separately, and the polarizer converts the light ray emitted by the display screen into the first-type polarized light or the second-type polarized light by controlling a displaying region of the display screen.

Optionally, the first-type polarized light is a P-type polarized light, and the second-type polarized light is an S-type polarized light.

In another aspect, there is provided a displaying device, wherein the displaying device comprises the optical displaying system stated above.

In yet another aspect, there is provided a method for controlling the optical displaying system stated above, wherein the method comprises:

at a first time period, inputting a first focal-plane-image signal into the display screen;

controlling the display screen to display a first focal-plane image;

controlling the first light splitting unit, so that the light ray emitted by the display screen is converted into the first-type polarized light after passing through the first light splitting unit, and the first-type polarized light enters the observation position after passing through sequentially the imaging unit, the second light splitting unit and the first optical-path unit;

at a second time period, inputting a second focal-plane-image signal into the display screen;

controlling the display screen to display a second focal-plane image; and controlling the first light splitting unit, so that the light ray emitted by the display screen is converted into the second-type polarized light after passing through the first light splitting unit, and the second-type polarized light enters the observation position after passing through sequentially the imaging unit, the second light splitting unit and the second optical-path unit.

Optionally, the first light splitting unit comprises a polarizer, the polarizer is disposed at the displaying side of the display screen, and the polarizer comprises a first-type polarizer and a second-type polarizer;

the step of controlling the first light splitting unit, so that the light ray emitted by the display screen is converted into the first-type polarized light after passing through the first light splitting unit comprises:

removing the second-type polarizer manually or electrically, so that the light ray emitted by the display screen is converted into the first-type polarized light after passing through the first-type polarizer; and the step of controlling the first light splitting unit, so that the light ray emitted by the display screen is converted into the second-type polarized light after passing through the first light splitting unit comprises:

removing the first-type polarizer manually or electrically, so that the light ray emitted by the display screen is converted into the first-type polarized light after passing through the second-type polarizer.

Optionally, the first light splitting unit comprises a polarizer, the polarizer clings to a display surface of the display screen, and the polarizer comprises a plurality of first-type polarizers and a plurality of second-type polarizers that are arranged separately;

the step of, at the first time period, inputting the first focal-plane-image signal into the display screen comprises:

at the first time period, inputting the first focal-plane-image signal into pixels in the display screen that correspond to the plurality of first-type polarizers; and the step of, at the second time period, inputting the second focal-plane-image signal into the display screen comprises:

at the second time period, inputting the second focal-plane-image signal into pixels in the display screen that correspond to the plurality of second-type polarizers.

The present disclosure further provides a computing and processing device, wherein the device comprises: a memory storing a computer-readable code; and one or more processors, wherein when the computer-readable code is executed by the one or more processors, the computing and processing device implements the method for controlling the optical displaying system stated above.

The present disclosure further provides a computer program, wherein the computer program comprises a computer-readable code, and when the computer-readable code is executed on a computing and processing device, the computer-readable code causes the computing and processing device to implement the method for controlling the optical displaying system stated above.

The present disclosure further provides a computer-readable medium, wherein the computer-readable medium stores the computer program stated above.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are merely embodiments of the present disclosure, and a person skilled in the art can obtain other figures according to these figures without paying creative work.

DETAILED DESCRIPTION

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the embodiments of the present disclosure, terms such as "first" and "second" are used to distinguish identical items or similar items that have substantially the same functions and effects, merely in order to clearly describe the technical solutions of the embodiments of the present disclosure, and should not be construed as indicating or implying the degrees of importance or implicitly indicating the quantity of the specified technical features.

Figure 1:
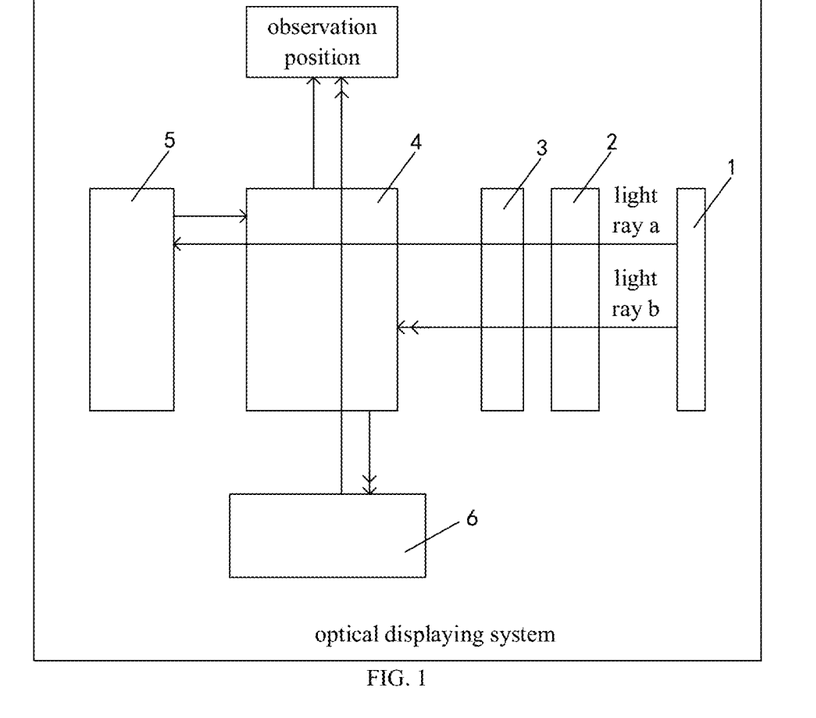
FIG. 1 is a schematic structural diagram of the optical displaying system according to an embodiment of the present disclosure.

An embodiment of the present disclosure provides an optical displaying system, referring to FIG. 1, the system comprises a display screen 1, a first light splitting unit 2, an imaging unit 3, a second light splitting unit 4, a first optical-path unit 5 and a second optical-path unit 6.

For the display screen 1, the type of the display screen is not limited herein. As an example, the display screen may be any one of a Liquid Crystal Display (LCD) display screen, an Organic Light-Emitting Diode (OLED) display screen, a Micro OLED micro-display screen, and a Mini LED micro-display screen, may also be a Digital Light Processing (DLP) display screen, may also be a Liquid Crystal on Silicon (LCOS) display screen, and so on. In addition, the display screen may be a flexible screen, and may also be a rigid screen (i.e., a non-flexible screen). In practical applications, it may be selected according to user demands.

The system further comprises a first light splitting unit 2 disposed at the displaying side of the display screen 1, wherein after a light ray emitted by the display screen passes through the first light splitting unit, the light ray is converted into a first-type polarized light or a second-type polarized light.

Herein, the displaying side of the display screen refers to the side of the display screen that emits the light rays, i.e., the light exiting side. In addition, the polarization vectors of the first-type polarized light and the second-type polarized light are different. As an example, the first-type polarized light is a P-type polarized light (referred to for short as a P light), and the second-type polarized light is an S-type polarized light (referred to for short as an S light).

The definitions of the P-type polarized light and the S-type polarized light will be explained below. When a light ray penetrates the surface of an optical element (such as a spectroscope) at a non-perpendicular angle, both of the characteristics of reflection and transmission rely on the polarization phenomenon. In this case, the employed coordinate system is defined by the plane containing the incident light beam and the reflected light beam. If the polarization vector of the light ray is within the plane, it is referred to as the P-type polarized light, and if the polarization vector of the light ray is perpendicular to the plane, it is referred to as the S-type polarized light.

The particular structure of the first light splitting unit is not limited herein, as long as the light ray emitted by the display screen can be converted into the first-type polarized light or the second-type polarized light. As an example, the first light splitting unit may be a light splitter, a polarizer and so on.

The system further comprises an imaging unit 3 disposed at the light exiting side of the first light splitting unit 2, wherein after the light ray exiting from the first light splitting unit passes through the imaging unit, the light ray forms an enlarged image corresponding to a first focal length.

The first focal length refers to the focal length comprised in the optical displaying system. Focal length is a measurement for measuring the convergence or divergence of the lights in an optical system, and refers to the distance from the center of the lens to the focus where the lights converge. The imaging unit may be a single lens or be the combination of a plurality of lenses (i.e., a multi-lens group). The function of the imaging unit is to generate the focal length, and enlarge the image.

The system further comprises a second light splitting unit 4 disposed at the light exiting side of the imaging unit 3, and configured to transmit the first-type polarized light and reflect the second-type polarized light.

The particular structure of the second light splitting unit is not limited herein, as long as it can transmit the first-type polarized light and reflect the second-type polarized light. If the first-type polarized light is the P-type polarized light and the second-type polarized light is the S-type polarized light, then the second light splitting unit can transmit the P-type polarized light and reflect the S-type polarized light.

The system further comprises a first optical-path unit 5, wherein after the first-type polarized light transmitted out of the second light splitting unit passes through the first optical-path unit, the first-type polarized light forms an enlarged image corresponding to a second focal length, is converted into the second-type polarized light, and then is reflected to an observation position by the second light splitting unit.

Herein, the second focal length is also a focal length comprised in the optical displaying system. The image formed by the first-type polarized light transmitted out of the second light splitting unit corresponds to the first focal length, and the image formed after the first-type polarized light transmitted out of the second light splitting unit passes through the first optical-path unit corresponds to the second focal length. In other words, the formation of the first focal length of the optical displaying system relies on the imaging unit, while the formation of the second focal length relies on the imaging unit and the first optical-path unit.

The particular structure of the first optical-path unit is not limited herein. If the first-type polarized light is the P-type polarized light and the second-type polarized light is the S-type polarized light, then, after the P-type polarized light transmitted out of the second light splitting unit passes through the first optical-path unit, the P-type polarized light forms an enlarged image corresponding to a second focal length, is converted into the S-type polarized light, and then is reflected to the observation position by the second light splitting unit.

The system further comprises a second optical-path unit 6, wherein after the second-type polarized light reflected out of the second light splitting unit passes through the second optical-path unit, the second-type polarized light is converted into the first-type polarized light, and then is transmitted to the observation position by the second light splitting unit.

The particular structure of the second optical-path unit is not limited herein. If the first-type polarized light is the P-type polarized light and the second-type polarized light is the S-type polarized light, then, after the S-type polarized light reflected out of the second light splitting unit passes through the second optical-path unit, the S-type polarized light is converted into the P-type polarized light, and then is transmitted to the observation position by the second light splitting unit.

It should be noted that, in FIG. 1, the light ray a passes through sequentially the first light splitting unit 2, the imaging unit 3, the second light splitting unit 4, the first optical-path unit 5 and the second light splitting unit 4 and finally enters the observation position, and the light ray b passes through sequentially the first light splitting unit 2, the imaging unit 3, the second light splitting unit 4, the second optical-path unit 6 and the second light splitting unit 4 and finally enters the observation position. In order to distinguish them more clearly, the direction of the light ray a as shown in FIG. 1 is indicated by a single-headed arrow, and the direction of the light ray b is indicated by a double-headed arrow.

The embodiments of the present disclosure provide an optical displaying system, wherein the optical displaying system comprises: a display screen; a first light splitting unit, disposed at a displaying side of the display screen, wherein after a light ray emitted by the display screen passes through the first light splitting unit, the light ray is converted into a first-type polarized light or a second-type polarized light; an imaging unit, disposed at a light exiting side of the first light splitting unit, wherein after the light ray exiting from the first light splitting unit passes through the imaging unit, the light ray forms an enlarged image corresponding to a first focal length; a second light splitting unit, disposed at a light exiting side of the imaging unit, and configured to transmit the first-type polarized light and reflect the second-type polarized light; a first optical-path unit, wherein after the first-type polarized light transmitted out of the second light splitting unit passes through the first optical-path unit, the first-type polarized light forms an enlarged image corresponding to a second focal length, is converted into the second-type polarized light, and then is reflected by the second light splitting unit to an observation position; and a second optical-path unit, wherein after the second-type polarized light reflected out of the second light splitting unit passes through the second optical-path unit, the second-type polarized light is converted into the first-type polarized light, and then is transmitted by the second light splitting unit to the observation position.

In the optical displaying system, when a light ray emitted by the display screen is converted into the first-type polarized light after passing through the first light splitting unit, the first-type polarized light enters the observation position after passing through sequentially the imaging unit, the second light splitting unit and the first optical-path unit. Accordingly, after the light ray emitted by the display screen has been enlarged by the imaging unit and the first optical-path unit, the enlarged image corresponding to the second focal length can be seen at the observation position. When the light ray emitted by the display screen is converted into the second-type polarized light after passing through the first light splitting unit, the second-type polarized light enters the observation position after passing through sequentially the imaging unit, the second light splitting unit and the second optical-path unit. Accordingly, after the light ray emitted by the display screen has been enlarged by the imaging unit, the enlarged image corresponding to the first focal length can be seen at the observation position. Therefore, when the human eyes are seeing two enlarged images that correspond to the different focal lengths, the human eyes are required to perform dioptric adjustment, thereby greatly alleviating the adverse experiences such as eyestrain and dizziness that easily emerge when the watcher is continuously watching a dynamic 3D-image process; in other words, the system can greatly alleviate the convergence conflict, and improve the user experience.

The optical displaying system comprises the first focal length and the second focal length, which can form a multi-focal-plane optical system, thereby realizing an effect of displaying of multiple depths of field. At the same time, the optical displaying system has a high optical efficiency, a small volume and a low cost.

Figure 2:
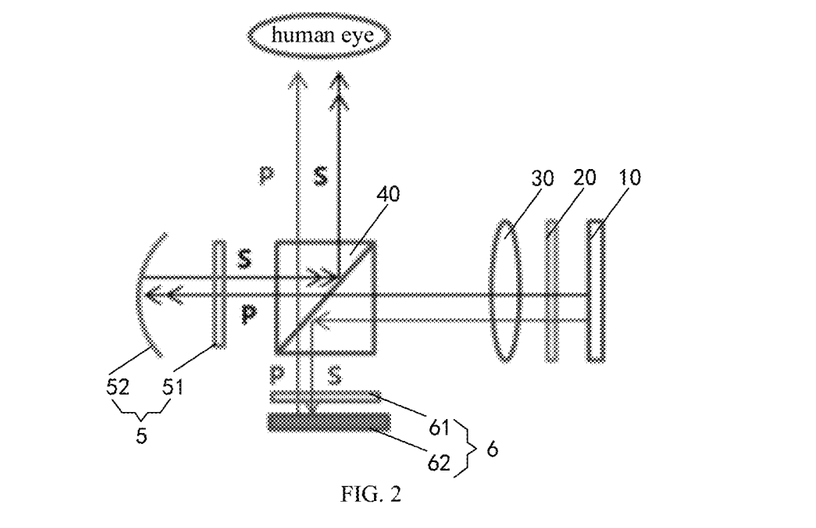
FIG. 2 is a schematic structural diagram of the optical displaying system according to another embodiment of the present disclosure.

Optionally, in order to reduce the difficulty in the fabrication, referring to FIG. 2, the first optical-path unit 5 comprises a first reflecting mirror 52, and a first quarter-wave plate 51 disposed in the optical path from the second light splitting unit to the first reflecting mirror.

Herein, the first reflecting mirror may be a spherical or aspherical single-sided reflecting mirror, and its function is to generate the focal length, and enlarge the image again. The quarter-wave plate (also referred to as a λ/4 wave plate) refers to a birefringent single-crystal wave plate having a certain thickness. When a light with a certain wavelength perpendicularly enters the wave plate, the phase difference between the emergent ordinary light and extraordinary light is ¼ wavelength. In the optical path, the wave plate is usually used to convert a linearly polarized light into a circularly polarized light or an elliptically polarized light, or, on the contrary, to change the polarization state of the light ray.

After the first-type polarized light transmitted out of the second light splitting unit passes through the first quarter-wave plate, the first-type polarized light is converted into a circularly polarized light or an elliptically polarized light. Subsequently, the circularly polarized light or the elliptically polarized light reaches the reflecting face of the first reflecting mirror, is enlarged and reflected by the reflecting mirror, and passes through the first quarter-wave plate again. The phase of the light ray changes again by the effect of the first quarter-wave plate, and the light ray is converted into the second-type polarized light. Finally, the second-type polarized light is reflected by the second light splitting unit to the observation position.

The two structures of the second optical-path unit will be particularly described below.

In a first type, the second optical-path unit is further configured to transmit an external light ray, wherein the external light ray passes through sequentially the second optical-path unit and the second light splitting unit and is transmitted to the observation position.

Such an optical displaying system may be used to form an Augmented Reality (AR) displaying device.

Optionally, referring to FIG. 2, the second optical-path unit 6 comprises a semi-transmission and semi-reflection mirror 62, and a second quarter-wave plate 61 disposed in the optical path from the second light splitting unit to the semi-transmission and semi-reflection mirror.

Herein, the semi-transmission and semi-reflection mirror may be formed by plating a semi-transmission and semi-reflection film on a plate glass, and may also be formed by plating a semi-transmission and semi-reflection film on a spherical mirror. The spherical mirror may be a spherical mirror of a constant thickness, which can better maintain the displayed content of the external light, to prevent image distortion. In addition, the thickness of the even spherical mirror may be less than 3 mm, to reduce imperfects such as ghost. Certainly, the semi-transmission and semi-reflection mirror herein may also comprise a plating film of another ratio of reflection to transmission, and is not limited to a semi-transmission and semi-reflection film of a ratio of reflection to transmission of 1:1. Certainly, in practice the semi-transmission and semi-reflection mirror is usually fabricated by using a semi-transmission and semi-reflection film.

After the second-type polarized light reflected out of the second light splitting unit passes through the second quarter-wave plate, its phase changes, and the second-type polarized light is converted into the circularly polarized light or the elliptically polarized light. Subsequently, the circularly polarized light or the elliptically polarized light reaches the semi-transmission and semi-reflection mirror, is reflected by the semi-transmission and semi-reflection mirror, and passes through the second quarter-wave plate again. The phase of the light ray changes again by the effect of the second quarter-wave plate, and the light ray is converted into the first-type polarized light. Finally, the first-type polarized light is transmitted by the second light splitting unit to the observation position. At the same time, the external light passes through sequentially the semi-transmission and semi-reflection mirror, the second quarter-wave plate and the second light splitting unit, and is transmitted to the observation position, to realize the effect of AR displaying.

In a second type, the second optical-path unit is further configured so that, after the second-type polarized light reflected out of the second light splitting unit passes through the second optical-path unit, the second-type polarized light forms an enlarged image corresponding to a third focal length, wherein the second focal length and the third focal length are different.

Herein, the third focal length is also a focal length comprised in the optical displaying system. The image formed by the second-type polarized light reflected out of the second light splitting unit corresponds to the first focal length, and the image formed after the second-type polarized light reflected out of the second light splitting unit passes through the second optical-path unit corresponds to the third focal length. In other words, the formation of the first focal length of the optical displaying system relies on the imaging unit, while the formation of the third focal length relies on the imaging unit and the second optical-path unit.

Such an optical displaying system may be used to form a Virtual Reality (VR) displaying device.

Optionally, the second optical-path unit comprises a second reflecting mirror, and a third quarter-wave plate disposed in an optical path from the second light splitting unit to the second reflecting mirror, wherein a curvature of the first reflecting mirror and a curvature of the second reflecting mirror are different.

Herein, the second reflecting mirror may be a spherical or aspherical single-sided reflecting mirror, and its function is to generate the focal length, and enlarge the image again. The curvature of the first reflecting mirror and the curvature of the second reflecting mirror are different, and therefore different focal lengths can be generated.

After the second-type polarized light reflected out of the second light splitting unit passes through the third quarter-wave plate, the second-type polarized light is converted into the circularly polarized light or the elliptically polarized light. Subsequently, the circularly polarized light or the elliptically polarized light reaches the reflecting face of the second reflecting mirror, and passes through the third quarter-wave plate again after being enlarged and reflected by the reflecting mirror. The phase of the light ray changes again by the effect of the third quarter-wave plate, and the light ray is converted into the first-type polarized light. Finally, the first-type polarized light is transmitted by the second light splitting unit to the observation position.

Optionally, referring to FIG. 2, the second light splitting unit comprises a polarization beam splitting prism 40. The polarization beam splitting prism is also referred to as a PBS beam splitting prism, and can split the incident non-polarized light into two beams of vertical linearly polarized lights, wherein the P-type polarized light passes completely, while the S-type polarized light is reflected at an angle of 45 degrees, with an emergence direction at an angle of 90 degrees with the P-type polarized light. The polarization beam splitting prism is formed by adhesive bonding between a pair of high-precision right-angle prisms, wherein one of the prisms is plated with a polarization light splitting dielectric film at the outer side of a bevel edge.

Optionally, the imaging unit includes at least one lens. The imaging unit may, as shown in FIG. 2, include merely a single lens 30, wherein the single lens may be a convex lens. Certainly, it may also comprise a lens group formed by a plurality of lenses, wherein the lens group may comprise a combination of a plurality of convex lenses, or comprise a combination of convex lenses and concave lenses. The lens may employ a biconvex spherical surface or an aspheric lens, and its function is to generate the focal length, and enlarge the image.

Optionally, the first light splitting unit includes a liquid-crystal phase modulator or a polarizer.

The liquid-crystal phase modulator is a light splitter, and may control the conversion of light rays by electric control.

The polarizer may be disposed at the displaying side of the display screen. It includes a first-type polarizer and a second-type polarizer, which may be switched manually or mechanically, to realize the real-time conversion of a light ray emitted by the display screen into the first-type polarized light or the second-type polarized light.

Figure 5:
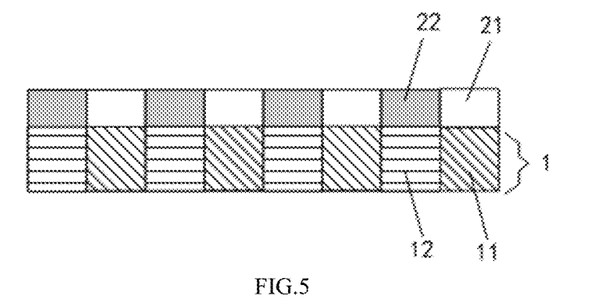
FIG. 5 is a schematic structural diagram of the polarizer according to an embodiment of the present disclosure.

Certainly, referring to FIG. 5, the polarizer may also cling to the display surface of the display screen 1, and include a plurality of first-type polarizers 21 and a plurality of second-type polarizers 22 that are arranged separately. That can, by controlling the displaying region of the display screen, realize converting the light ray emitted by the display screen into the first-type polarized light or the second-type polarized light. As an example, at a first time period, a first focal-plane-image signal is inputted into the pixels 11 in the display screen 1 that correspond to the plurality of first-type polarizers 21. At the moment, the light rays emitted by the pixels 11 in the display screen that correspond to the plurality of first-type polarizers pass through the first-type polarizers 21 and are converted into the first-type polarized light. At a second time period, a second focal-plane-image signal is inputted into the pixels 12 in the display screen 1 that correspond to the plurality of second-type polarizers 22. At the moment, the light rays emitted by the pixels 12 in the display screen 1 that correspond to the plurality of second-type polarizers 22 pass through the second-type polarizers 22 and are converted into the second-type polarized light.

When the first-type polarized light is the P-type polarized light and the second-type polarized light is the S-type polarized light, the first-type polarizers is a P-type polarizer, and the second-type polarizer is an S-type polarizer.

Optionally, in practical applications, the first-type polarized light is the P-type polarized light, and the second-type polarized light is the S-type polarized light.

The present disclosure will be described in detail below with reference to the optical displaying system shown in FIG. 2.

In FIG. 2, the display screen is a Micro OLED display screen 10, the first light splitting unit is an electrically driven or manually driven P/S light splitter 20, the imaging unit is a single lens 30, the second light splitting unit is a PBS beam splitting prism 40, the first optical-path unit includes a first reflecting mirror 52 and a first λ/4 wave plate 51, and the second optical-path unit comprises a semi-transmission and semi-reflection mirror 62 and a second λ/4 wave plate 61.

Figure 3:
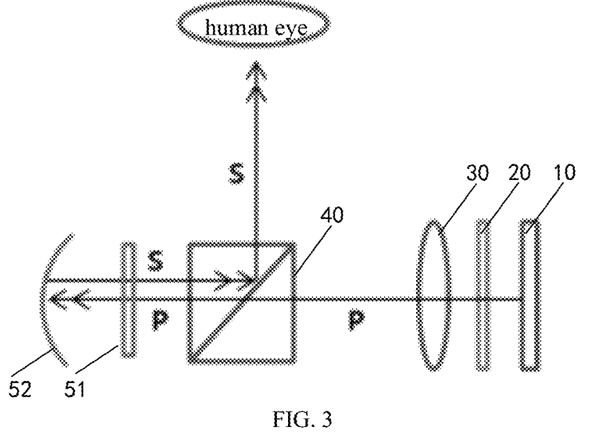
FIG. 3 is a schematic diagram of an optical path in FIG. 2.

Referring to FIG. 3, the Micro OLED micro-display screen 10 emits an image M1 representing the scene of the focal plane A1, and the light rays of the image M1 pass through the electrically driven or manually driven P/S light splitter 20, to realize that the P light is transmitted and the S light is absorbed. Subsequently, the P light of the image M1 passes through the single lens (lens1) 30 to realize one-time enlargement, and then passes through the PBS beam splitting prism 40. Because the function of the PBS prism is to transmit the P light and reflect the S light, here the P light transmits completely. Subsequently, the P light passes through the first λ/4 wave plate 51, is converted into a left-handed circularly polarized light (viewed from lens2 to the first λ/4 wave plate), reaches the reflecting face of the first reflecting mirror (lens2) 52, is enlarged again, propagates back, and passes through the first λ/4 wave plate 51 again. Subsequently, the phase of the light ray changes by the effect of the first λ/4 wave plate, and the light ray is converted into an S light. Subsequently, it reaches the PBS prism 40 again, and is reflected to the position of a human eye. Accordingly, the human eye receives an image that has been enlarged two times by lens1 and lens2, wherein the image is a virtual image N1 located at the focal length B1.

The optical efficiency of the optical displaying system is 50%, and the theoretical loss is merely at the electrically driven or manually driven P/S light splitter.

Figure 4:
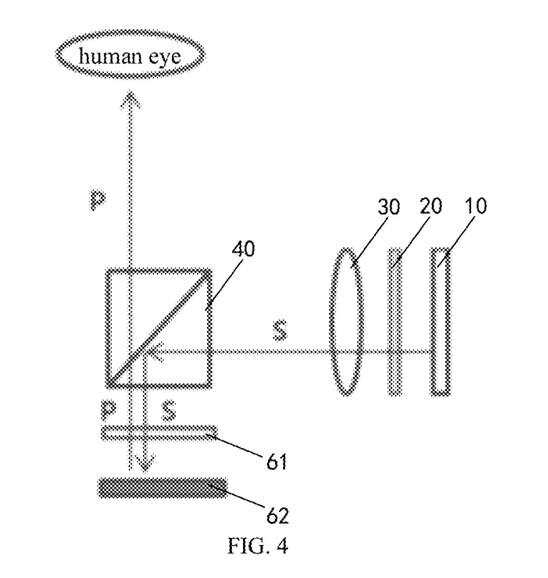
FIG. 4 is a schematic diagram of another optical path in FIG. 2.

Referring to FIG. 4, the Micro OLED micro-display screen 10 emits an image M2 representing the scene of the focal plane A2, and the light rays of the image M2 pass through the electrically driven or manually driven P/S light splitter 20, to realize that the S light is transmitted and the P light is absorbed. Subsequently, the S light of the image M2 passes through the single lens (lens1) 30 to realize one-time enlargement, and then passes through the PBS beam splitting prism 40. The S light is reflected to the second λ/4 wave plate 61 and the semi-transmission and semi-reflection mirror 62. Subsequently, the S light passes through the second λ/4 wave plate 61, is converted into a right-handed circularly polarized light (viewed from the semi-transmission and semi-reflection mirror to the second λ/4 wave plate), reaches the semi-transmission and semi-reflection mirror 62, partially transmits it, is partially reflected, and passes through the second λ/4 wave plate 61 again. The phase of the light ray changes by the effect of the second λ/4 wave plate, and the light ray is converted into a P light. Finally, it reaches the PBS prism 40 again, and is totally transmitted to the position of a human eye. Accordingly, the human eye receives an image that has been enlarged one time by lens1, wherein the image is a virtual image N2 located at the focal length B2. At the same time, because the PBS beam splitting prism and the semi-transmission and semi-reflection mirror are transparent, an external object can be observed; in other words, an external light ray can also be transmitted, and be received by the human eye, to realize the effect of AR displaying.

The optical displaying system has multiple focal lengths, and can alleviate the adverse experiences such as eyestrain and dizziness that easily emerge when the watcher is continuously watching a dynamic 3D-image process; in other words, it can greatly alleviate the convergence conflict, and improve the user experience. At the same time, it can realize AR displaying of multiple depths of field, and has the characteristics of a high optical efficiency, a small volume and a low cost.

An embodiment of the present disclosure provides a displaying device, wherein the displaying device comprises the optical displaying system according to the above embodiments.

The displaying device can greatly ameliorate the human eye strain caused by convergence conflict, and has the characteristics of a good user experience, a high optical efficiency and a small volume. The displaying device may be a Virtual Reality (VR) displaying device, and may also be an Augmented Reality (AR) displaying device.

An embodiment of the present disclosure provides a method for controlling the optical displaying system according to the above embodiments, wherein the method comprises:

S01: at a first time period, inputting a first focal-plane-image signal into the display screen.

The focal plane refers to the plane that passes through the focus and is perpendicular to the principal optic axis of the system.

S02: controlling the display screen to display a first focal-plane image.

S03: controlling the first light splitting unit, so that the light ray emitted by the display screen is converted into the first-type polarized light after passing through the first light splitting unit, and the first-type polarized light enters the observation position after passing through sequentially the imaging unit, the second light splitting unit and the first optical-path unit.

S04: at a second time period, inputting a second focal-plane-image signal into the display screen.

The focal planes where the second focal-plane image and the first focal-plane image are located may be the same, and may also be different. In order for a better effect of displaying, the latter is preferable.

S05: controlling the display screen to display a second focal-plane image.

S06: controlling the first light splitting unit, so that the light ray emitted by the display screen is converted into the second-type polarized light after passing through the first light splitting unit, and the second-type polarized light enters the observation position after passing through sequentially the imaging unit, the second light splitting unit and the second optical-path unit.

The embodiments of the present disclosure provide a method for controlling the optical displaying system. The controlling method can realize converting the first focal-plane image displayed by the display screen into an enlarged image corresponding to the second focal length, and converting the second focal-plane image displayed by the display screen into an enlarged image corresponding to the first focal length, thereby realizing that the human eyes see two enlarged images that correspond to different focal lengths, thereby in turn alleviating the problem of the convergence conflict of the optical displaying system, to improve the user experience.

It will be explained below, by using individually the two structures of the polarizer comprised in the first light splitting unit, how the first light splitting unit realizes the conversion of the light ray emitted by the display screen into the first-type polarized light or the second-type polarized light.

In a first type, the first light splitting unit includes a polarizer, the polarizer is disposed at the displaying side of the display screen, and the polarizer includes a first-type polarizer and a second-type polarizer.

S03: the step of controlling the first light splitting unit, so that the light ray emitted by the display screen is converted into the first-type polarized light after passing through the first light splitting unit includes:

removing the second-type polarizer manually or electrically, so that the light ray emitted by the display screen is converted into the first-type polarized light after passing through the first-type polarizer.

S06: the step of controlling the first light splitting unit, so that the light ray emitted by the display screen is converted into the second-type polarized light after passing through the first light splitting unit includes:

removing the first-type polarizer manually or electrically, so that the light ray emitted by the display screen is converted into the first-type polarized light after passing through the second-type polarizer.

In a second type, the first light splitting unit includes a polarizer, the polarizer clings to the display surface of the display screen, and the polarizer includes a plurality of first-type polarizers and a plurality of second-type polarizers that are arranged separately.

S01: the step of, at the first time period, inputting the first focal-plane-image signal into the display screen includes:

at the first time period, inputting a first focal-plane-image signal into pixels in the display screen that correspond to the plurality of first-type polarizers. At the moment, the pixels corresponding to the plurality of second-type polarizers are not inputted a signal.

S04: the step of, at the second time period, inputting the second focal-plane-image signal into the display screen includes:

at the second time period, inputting a second focal-plane-image signal into pixels in the display screen that correspond to the plurality of second-type polarizers. At the moment, the pixels corresponding to the plurality of first-type polarizers are not inputted a signal.

The contents related to the structure of the optical displaying system in the present embodiment may refer to the above embodiments, and are not discussed here further in the present embodiment.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the computing and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or disposed at a carrier signal, or disposed in any other forms.

Figure 6:
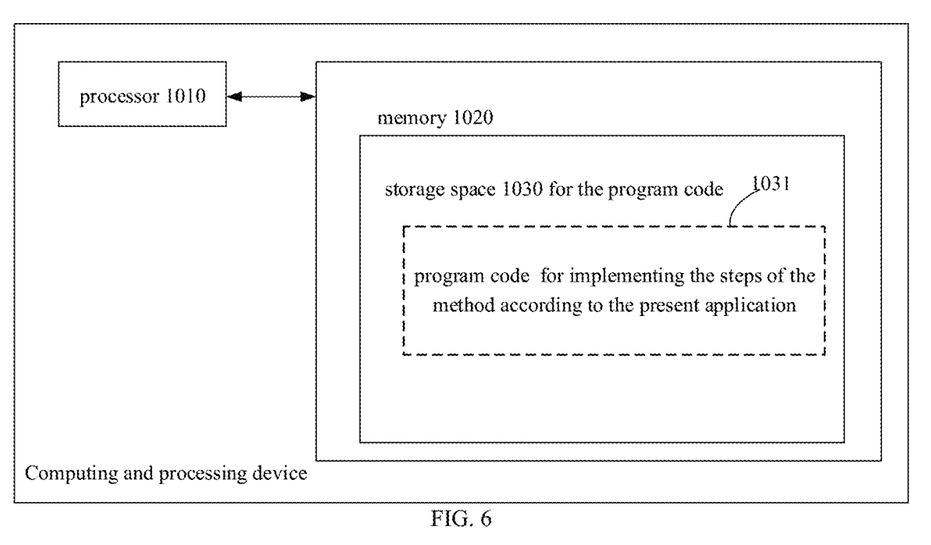
FIG. 6 schematically shows a block diagram of a computing and processing device for implementing the method according to the present disclosure.
Figure 7:
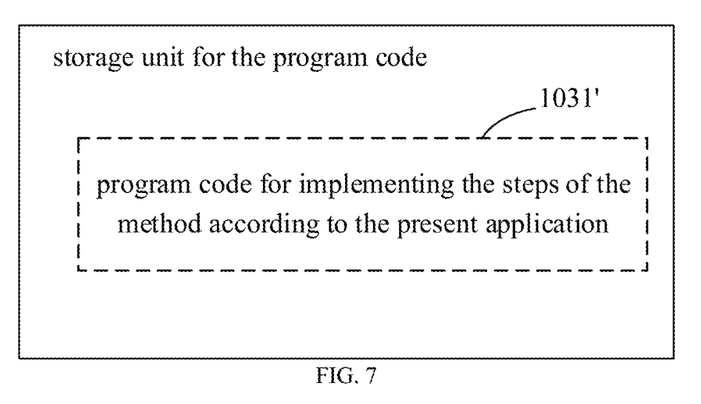
FIG. 7 schematically shows a storage unit for maintaining or carrying a program code for implementing the method according to the present disclosure.

For example, FIG. 6 shows a computing and processing device that can implement the method according to the present disclosure. The computing and processing device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 7. The storage unit may have storage segments or storage spaces with similar arrangement to the memory 1020 of the computing and processing device in FIG. 6. The program codes may, for example, be compressed in a suitable form. Generally, the storage unit contains a computer-readable code 1031', which can be read by a processor like 1010. When those codes are executed by the computing and processing device, the codes cause the computing and processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

The above are merely particular embodiments of the present disclosure, and the protection scope of the present disclosure is not limited thereto. All of the variations or substitutions that a person skilled in the art can easily envisage within the technical scope disclosed by the present disclosure should fall within the protection scope of the present disclosure. Therefore, the protection scope of the present disclosure should be subject to the protection scope of the claims.

The invention claimed is:

1. An optical displaying system, wherein the optical displaying system comprises:
   a display screen;
   a first light splitting unit, disposed at a displaying side of the display screen, wherein after a light ray emitted by the display screen passes through the first light splitting unit, the light ray is converted into a first-type polarized light or a second-type polarized light; wherein the first light splitting unit comprises a polarizer;
   an imaging unit, disposed at a light exiting side of the first light splitting unit, wherein after a light ray exiting from the first light splitting unit passes through the imaging unit, the light ray forms an enlarged image corresponding to a first focal length; wherein the imaging unit comprises at least one lens;
   a second light splitting unit, disposed at a light exiting side of the imaging unit, and configured to transmit the first-type polarized light and reflect the second-type polarized light; wherein the second light splitting unit comprises a polarization beam splitting prism;
   a first optical-path unit, wherein after the first-type polarized light transmitted out of the second light splitting unit passes through the first optical-path unit, the first-type polarized light forms an enlarged image corresponding to a second focal length, and is converted into the second-type polarized light, and is then reflected to an observation position by the second light splitting unit; wherein the first optical-path unit comprises at least a quarter-wave plate; and
   a second optical-path unit, wherein after the second-type polarized light reflected out of the second light splitting unit passes through the second optical-path unit, the second-type polarized light is the enlarged image corresponding to the first focal length or forms an enlarged image corresponding to a third focal length, the second-type polarized light is converted into the first-type polarized light, and is then transmitted to the observation position by the second light splitting unit; wherein the second optical-path unit comprises at least a quarter-wave plate; wherein the first focal length, the second focal length, and the third focal length are all different;
   wherein the polarizer clings to a display surface of the display screen, and the polarizer comprises a plurality of first-type polarizers and a plurality of second-type polarizers that are arranged separately; wherein at a first time period, a first focal-plane-image signal is inputted into pixels in the display screen that correspond to the plurality of first-type polarizers, the plurality of second-type polarizers are removed manually or electrically, so that the light ray emitted by the display screen is converted into the first-type polarized light after passing through the first-type polarizer, and pixels corresponding to the plurality of second-type polarizers are not inputted a signal; at a second time period, a second focal-plane-image signal is inputted into pixels in the display screen that correspond to the plurality of second-type polarizers, the plurality of first-type polarizers are removed manually or electrically, so that the light ray emitted by the display screen is converted into the second-type polarized light after passing through the second-type polarizer, and the pixels corresponding to the plurality of first-type polarizers are not inputted a signal.

2. The optical displaying system according to claim 1, wherein the first optical-path unit comprises a first reflecting mirror, and a first quarter-wave plate disposed in an optical path from the second light splitting unit to the first reflecting mirror.

3. The optical displaying system according to claim 2, wherein the first quarter-wave plate is a birefringent single-crystal wave plate.

4. The optical displaying system according to claim 1, wherein the second optical-path unit is further configured to transmit an external light ray, wherein the external light ray passes through sequentially the second optical-path unit and the second light splitting unit and is transmitted to the observation position.

5. The optical displaying system according to claim 4, wherein the second optical-path unit comprises a semi-transmission and semi-reflection mirror, and a second quarter-wave plate disposed in an optical path from the second light splitting unit to the semi-transmission and semi-reflection mirror.

6. The optical displaying system according to claim 5, wherein the semi-transmission and semi-reflection mirror is formed by plating a semi-transmission and semi-reflection film on a plate glass, or is formed by plating a semi-transmission and semi-reflection film on a spherical mirror;
   wherein the spherical mirror has a constant thickness, and the thickness of the spherical mirror is less than 3 mm.

7. The optical displaying system according to claim 1, wherein the second optical-path unit is further configured so that, after the second-type polarized light reflected out of the second light splitting unit passes through the second optical-path unit, the second-type polarized light forms the enlarged image corresponding to the third focal length.

8. The optical displaying system according to claim 4, wherein the second optical-path unit comprises a second reflecting mirror, and a third quarter-wave plate disposed in an optical path from the second light splitting unit to the second reflecting mirror, wherein a curvature of the first reflecting mirror and a curvature of the second reflecting mirror are different.

9. The optical displaying system according to claim 1, wherein the first-type polarized light is a P-type polarized light, and the second-type polarized light is an S-type polarized light.

10. A displaying device, wherein the displaying device comprises the optical displaying system according to claim 1.

11. A method for controlling the optical displaying system according to claim 1, wherein the method comprises:
    at the first time period, inputting the first focal-plane-image signal into pixels in the display screen that correspond to the plurality of first-type polarizers;
    controlling the display screen to display a first focal-plane image;
    controlling the first light splitting unit, to remove the plurality of second-type polarizers manually or electrically, so that the light ray emitted by the display screen is converted into the first-type polarized light after passing through the first-type polarizer, and pixels corresponding to the plurality of second-type polarizers are not inputted a signal; and the first-type polarized light enters the observation position after passing through sequentially the imaging unit, the second light splitting unit and the first optical-path unit;
    at a second time period, inputting the second focal-plane-image signal into pixels in the display screen that correspond to the plurality of second-type polarizers;
    controlling the display screen to display a second focal-plane image; and controlling the first light splitting unit, to remove the plurality of first-type polarizers manually or electrically, so that the light ray emitted by the display screen is converted into the second-type polarized light after passing through the second-type polarizer, and the pixels corresponding to the plurality of first-type polarizers are not inputted a signal; and the second-type polarized light enters the observation position after passing through sequentially the imaging unit, the second light splitting unit and the second optical-path unit.

12. A computing and processing device, wherein the device comprises:
   a memory storing a computer-readable code; and
   one or more processors, wherein when the computer-readable code is executed by the one or more processors, the computing and processing device implements the method for controlling the optical displaying system according to claim 11.

13. A nonvolatile computer-readable medium, wherein the nonvolatile computer-readable medium stores a computer program, when the computer program is executed on a computing and processing device, the computer program causes the computing and processing device to implement the method for controlling the optical displaying system according to claim 11.

* * * * *